Dec. 30, 1969  J. C. FRANKS  3,486,300
CHROMATOGRAPHIC METHOD
Filed July 15, 1968  3 Sheets-Sheet 1

INVENTOR.
James C. Franks
BY
AGENT

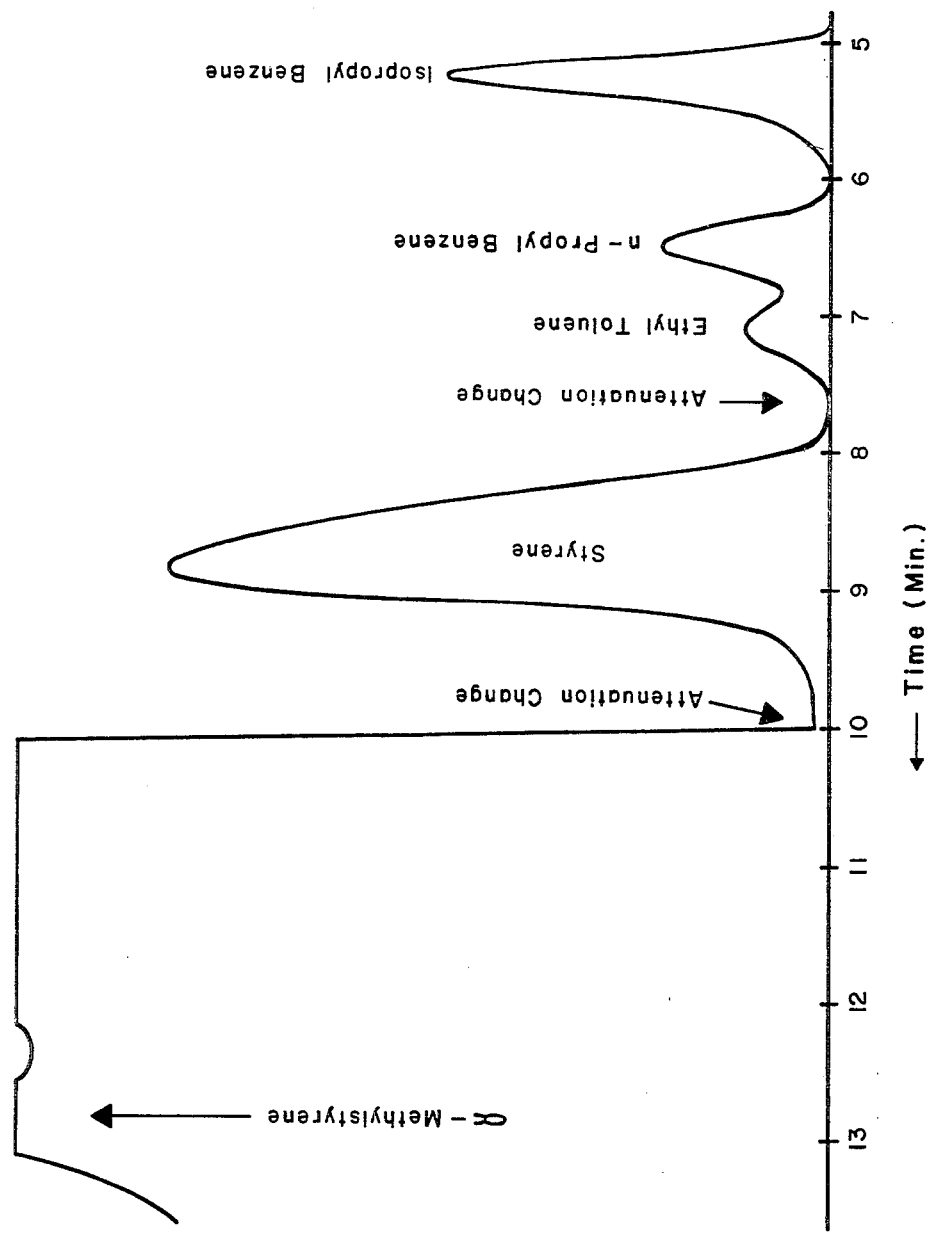

~~~
United States Patent Office 3,486,300
Patented Dec. 30, 1969

3,486,300
CHROMATOGRAPHIC METHOD
James C. Franks, Dickinson, Tex., assignor to Monsanto Company, St. Louis, Mo., a corporation of Delaware
Filed July 15, 1968, Ser. No. 744,736
Int. Cl. B01d *15/08*
U.S. Cl. 55—67                    10 Claims

ABSTRACT OF THE DISCLOSURE

A chromatographic method wherein a first carrier fluid sweeps a sample from a sample valve through a vaporizer and into a column. The flow of the first carrier fluid is switched to by-pass the valve and vaporizer, and a second carrier fluid flushes the remaining portion of sample from the vaporizer simultaneously with the switching of the flow of the first carrier fluid.

BACKGROUND OF THE INVENTION

The present invention relates to a method for the chromatographic analysis of trace components in a liquid mixture.

One of the most widely used methods for the separation of a fluid mixture into its individual components is chromatography. In vapor-phase chromatography, a fluid mixture to be separated and a carrier gas are introduced into an elongated body of particles of a sorptive material. The sorptive material contained in the elongated body, commonly referred to as a chromatographic column, is either an adsorbent in granular form or an inert, granular material on which has been deposited a film or coating of a desired non-volatile liquid absorbent. If the fluid mixture is a liquid, it is necessary that it be vaporized prior to being passed into the column. This is generally accomplished by injecting the sample into a high temperature zone called a "flasher." In the case of gases, of course, this prior vaporization step is unnecessary.

The components of the fluid mixture are swept through the column by the carrier gas at different rates of speed, which are dependent upon the respective affinities of the sorptive material for them. Under constant conditions, i.e., at a given temperature, flow rate, and pressure, and with the same carrier gas, column, column conditions, etc., the affinity of the sorptive material for each component of the fluid mixture will remain constant. Therefore, each component of the fluid mixture will be held by the sorptive material for a time which is characteristic of it alone, said time being referred to as the component's "retention time."

Unfortunately, many compounds because of very similar molecular structure have very close retention times, i.e., they are separated only by a short period of time. This situation poses a very serious problem when two components having very nearly the same retention time are present in widely varying amounts and the component present in very minute amounts, sometimes called the trace component, has a retention time such that it is eluted after but very near the component present in large amounts. The problem arises due to the fact that the larger component does not appear as a symmetrical peak but rather has a large so-called "tail" which somewhat approximates an exponential decay curve. This tailing problem is generally noted when the fluid mixture being separated is a liquid. The tailing can probably best be accounted for by the fact that when a sample of the liquid mixture is vaporized in the flasher, all of the same is not "instantaneously" vaporized, i.e., a very small fraction (<1%) of the sample volatilizes at a slightly slower rate due to such factors as adsorption on the walls of the flasher, incomplete heat-transfer, etc. This relatively slow vaporization results in the appearance of the tail on the peak. Under these circumstances, the trace component will not appear as a separate symmetrical peak but rather will either be completely masked by the peak due to the large component or it will appear as an inflection on the tail of the peak due to the large component. When this occurs, accurate analysis of the trace component is not possible. In methods heretofore proposed to overcome this problem, two chromatographic columns have been needed for the analysis in addition to which the methods are quite time-consuming.

SUMMARY OF THE INVENTION

It is, therefore, an object of the present invention to provide an improved method for the chromatographic analysis of trace components in liquid process streams. It is also an object of the present invention to provide a method for the chromatographic analysis of a stream containing a group of components wherein one of said components, present in minor amounts, i.e., a trace component, is eluted after and very close to a major component such that the peak due to the major component interferes with the measurement of the peak due to the trace component.

These and other objects of the present invention, which will be apparent from the drawings and appended claims together with the disclosure herein, can be accomplished by a method which comprises sampling a liquid mixture in a sampling value to obtain a fixed volume of sample, said mixture containing a group of components in such relative amounts and having physical characteristics such that at least one component in minor proportion is eluted after and on the tail of a component in major proportion, supplying a flow of a first carrier fluid to sweep said sample out of said sampling valve into a vaporizer, maintaining the flow of said first carrier fluid for a time period such that vaporization of substantially all of said sample is effected and the vaporized portion of said sample is swept into a chromatographic column, switching the flow of the first carrier fluid such that said flow bypasses said sampling valve and said vaporizer and is maintained through said column, supplying simultaneously with the switching of the flow of said first carrier fluid a flow of a second carrier fluid through said sampling valve and said vaporizer to sweep from said vaporizer the remaining portion of said sample and venting the resulting mixture of said second carrier fluid and said remaining portion of said sample.

BRIEF DESCRIPTION OF THE DRAWINGS

FIGURES 3 and 4 are chromatograms of a styrene sample comparing the use of the method of the present invention with a prior art method.

DESCRIPTION OF THE PREFERRED EMBODIMENTS

For purposes of simplicity, the component in minor proportion and the component in major proportion will hereafter be called the trace component and the major component, respectively, the trace component being present in very small amounts relative to the major component and having a retention time slightly longer than the major component such that the trace component elutes from a chromatographic column just after the major component.

Figure 1:
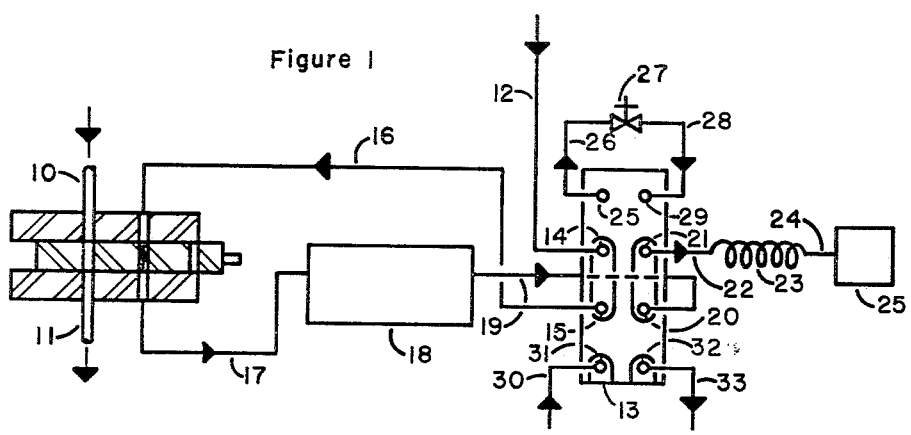

The method of the present invention takes place in two steps. Reference is now made in FIGURE 1 for a detailed description of the first step. In the first step, which
~~~ may be called the sample inject cycle, a fixed volume sample of the stream to be analyzed passing through line 10 is obtained by means of sampling valve 11. Sampling valve 11 can be of any conventional type commonly used in gas chromatography. A suitable valve is described in ISA Proceedings, 7, 123–132 (1961). A carrier gas (source not shown) flows through line 12 and enters switching valve 13 at port 14. Switching valve 13 can be of various types. As shown in FIGURE 1, switching valve 13 is an 8-port valve of the sliding plate variety commonly used in gas chromatography for column switching. This valve and its operation is also fully described in the above referred to ISA Proceedings. It should be noted that in this sample inject cycle ports 14 and 15 are in open communication with each other, ports 20 and 21 are likewise connected and ports 25 and 29 are connected together externally through line 26, restrictor valve 27 and line 28. The carrier gas after passing through switching valve 13 exits via port 15. The carrier gas flows through line 16 into sampling valve 11 sweeping the sample which has been "trapped" in sampling valve 11 into line 17 and then through vaporizer 18. The sample and carrier gas pass out of vaporizer 18 via line 19 into switching valve 13 via port 20, out of switching valve 13 via port 21, into line 22 and then into column 23 which is capable of effecting the chromatographic separation of a fluid stream into two or more components. The effluent from column 23 passes via line 24 into detector 25 where the individual components from the sample are detected and measured.

Figure 2:
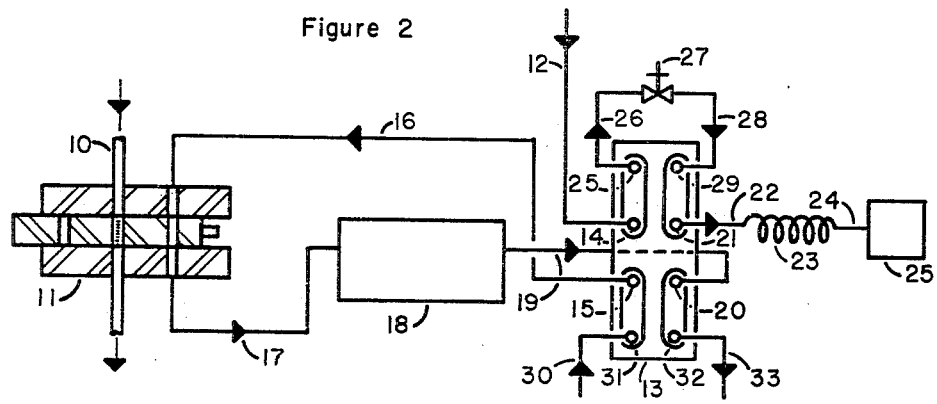
FIGURES 1 and 2 are schematic representations of a system for carrying out the method of the present invention.

The flow arrangement as shown in FIGURE 1 is maintained for a time period, which may be called the sample injection time, of such duration that substantially all the sample in vaporizer 18 is volatilized. The expression "substantially all" as used herein means that >99 but <100% of the sample is vaporized. At this point, the second step of the method which may be called the sample elution cycle, which is shown in FIGURE 2, is started. Switching valve 13 is switched such that ports 14 and 25 are connected, ports 29 and 21 are connected, ports 15 and 31 are connected and ports 32 and 20 are connected. Coincident with the switching of valve 13, sampling valve 11 is also adjusted as shown in FIGURE 2. In this case, the carrier gas entering at port 14 exits at port 25 passes through line 26 and restrictor valve 27 through line 28, re-enters switching valve 13 at port 29 re-exits at port 21 again passes through line 22 into column 23 and serves to carry the vaporized portion of the sample via line 24 to detector 25 where the components of the sample are detected and measured. Simultaneously, a second carrier gas via line 30 enters switching valve 13 at port 31 exits at port 15 passes through line 16 through sample valve 11 into line 17 to vaporizer 18, exits vaporizer 18 into line 19, enters switching valve 13 at port 20, exits port 32 and passes to vent via line 33. Thus, the unvaporized portion of the sample, i.e., that portion which due to adsorption on the walls of the flasher or incomplete heat-transfer, etc., does not vaporize within the sample injection time will be prevented from entering column 23 but will instead be passed to vent. As explained above, any tailing due to slow vaporization will be effectively done away with.

Figure 4:
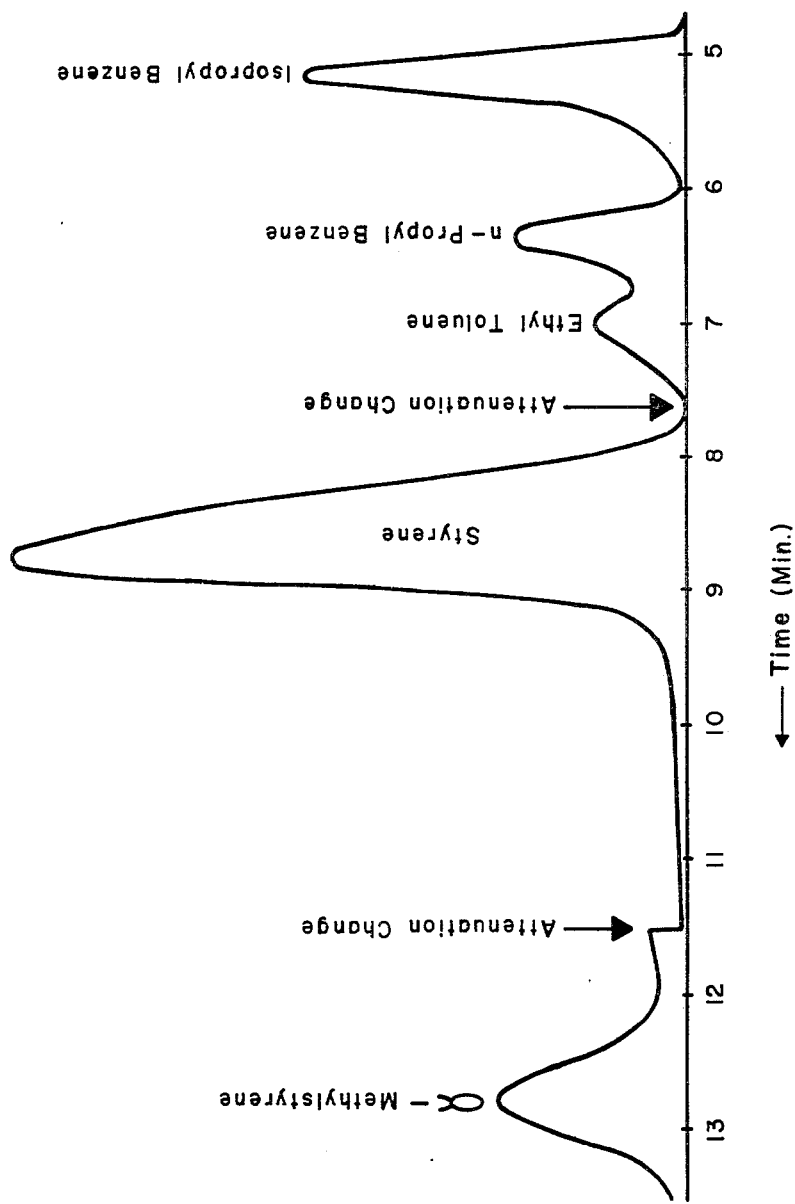

The usefulness of the present invention can be seen by reference to FIGURES 3 and 4. Attenuation changes noted on the figures are required in order that the various components can be brought within the sensitivity range of the recorder. In FIGURE 3, is shown a chromatogram of a styrene sample using a normal 4-port valve for sample introduction. As can be seen from FIGURE 3, the peak from the α-methylstyrene trace component is practically completely masked by the large "tail" on the styrene peak. In FIGURE 4, is a chromatogram of an identical styrene sample obtained using the method disclosed herein. As is readily seen from a comparison of the two figures, the method of the present invention allows accurate analysis of the α-methylstyrene trace component whereas analysis of said component by the conventional method (FIGURE 3) is not possible. It is to be noted in FIGURE 4 that almost base-like separation of the peak due to α-methylstyrene is achieved using the method of the present invention.

Preferably, the method of the present invention is employed in the analysis of liquid process streams. When thus used, the method can be easily automated by the use of programmers and similar timing devices which can be coupled with various control devices such as transducers to actuate the valves.

The present invention is applicable to the analysis of any stream which contains a group of components of which a trace component and a major component bears the relationship described above, i.e., as to relative retention time. Preferably, the method is used when the weight ratio of the amount of the component in major proportion to that of the component in minor proportion, i.e., the trace component, is from about 100:1 to about 10,000:1.

The time period, i.e., the sample injection time, used in the method can vary over wide limits. However, it has been found that periods much shorter than 5 seconds result in reduced peak size, whereas periods much in excess of 90 seconds result in the trace component being masked by the tail of the larger or major component. When time periods from 5 to 90 seconds are employed, the peak heights and widths of the eluted components have been found to be constant.

The vaporizer temperature can be maintained over a wide range without any deleterious effect on the method. Peak heights of the eluted components have been found to be independent of vaporizer temperature over a range of about 85 to 200° C. Higher temperatures can, of course, be used; however, the above range is generally preferred.

The carrier fluids employed can be any inert gas commonly used for such in gas chromatography. Preferred gases include nitrogen, helium, argon, and hydrogen. The flow rates of the carrier fluids can vary from 10 to 100 cc./min. with flow rates of 25 to 75 cc./min. being preferred.

The method of the present invention is applicable to a wide variety of process streams. The method finds particular application, however, in the analysis of hydrocarbon streams and it is especially desirable to employ the method in the analysis of a styrene stream wherein the major component is styrene and the trace or minor component is α-methylstyrene. When the present method is applied to the analysis of a styrene stream, it is preferred that the sample injection period be from 10 to 30 seconds.

It is to be understood that the parameters such as carrier fluid flow rates, vaporizer temperatures, time periods, etc., will all vary depending on the particular sample being analyzed. Therefore, ranges outside those disclosed herein may also be used without departing from the scope of the invention.

The method is not limited to a particular chromatographic column or detector. Any number of column substrates can be employed depending on the sample being analyzed. The construction of the vaporizer is not critical; for example, a coil of stainless steel tubing wrapped around a cartridge heater has been found to work quite satisfactorily.

What is claimed is:

1. A chromatographic method comprising:
   sampling a liquid mixture in a sampling valve to obtain a fixed volume of sample, said mixture containing a group of components in such relative amounts and having physical characteristics such that at least one component in minor proportion is eluted after and on the tail of a component in major proportion, supplying a flow of a first carrier fluid to sweep said sample out of said sampling valve into a vaporizer, maintaining the flow of said first carrier fluid for a time period such that vaporization of substantially all of said sample is effected and the vaporized portion of said sample is swept into a chromatographic column, switching the flow of said first carrier fluid such that said flow bypasses said sampling valve and said vaporizer and is maintained through said column, supplying simultaneously with the switching of the flow of said first carrier fluid a flow of a second carrier fluid through said sampling valve and said vaporizer to sweep from said vaporizer the remaining portion of said sample and venting the resulting mixture of said second carrier fluid and said remaining portion of said sample.

2. The method of claim 1 wherein said time period is from 5 to 90 seconds.

3. The method of claim 1 wherein said vaporizer is maintained at a temperature in the range of from about 85 to about 200° C.

4. The method of claim 1 wherein the weight ratio of the amount of the component in major proportion to that of the component in minor proportion is from about 100:1 to about 10,000:1.

5. The method of claim 1 wherein said first carrier fluid and said second carrier fluid are selected from the group consisting of nitrogen, helium, argon and hydrogen.

6. The method of claim 5 wherein the flow rate of said first carrier fluid and said second carrier fluid is from 25 to 75 cc./minute.

7. The method of claim 1 which includes detecting said component in minor proportion.

8. The method of claim 1 wherein said liquid mixture comprises a mixture of hydrocarbons.

9. The method of claim 8 wherein said component in minor proportion is $\alpha$-methylstyrene and said component in major proportions is styrene.

10. The method of claim 9 wherein said time period is from 10 to 30 seconds.

References Cited

UNITED STATES PATENTS 3,352,089  11/1967  Modell et al. _____ 55—67

JAMES L. DECESARE, Primary Examiner